(12) United States Patent
Alvarez

(10) Patent No.: US 10,717,454 B1
(45) Date of Patent: Jul. 21, 2020

(54) COLLAPSIBLE UTILITY CART

(71) Applicant: Maria Alvarez, Los Angeles, CA (US)

(72) Inventor: Maria Alvarez, Los Angeles, CA (US)

( * ) Notice: Subject to any disclaimer, the term of this patent is extended or adjusted under 35 U.S.C. 154(b) by 0 days.

(21) Appl. No.: 16/719,383

(22) Filed: Dec. 18, 2019

(51) Int. Cl.
*B62B 3/02* (2006.01)
*B62B 3/00* (2006.01)

(52) U.S. Cl.
CPC ............... *B62B 3/02* (2013.01); *B62B 3/004* (2013.01); *B62B 3/005* (2013.01); *B62B 2202/67* (2013.01)

(58) Field of Classification Search
CPC ....................................................... B62B 3/02; B62B 3/004; B62B 3/005; B62B 2202/67
See application file for complete search history.

(56) References Cited

U.S. PATENT DOCUMENTS

| | | | | |
|---|---|---|---|---|
| 3,191,956 A | * | 6/1965 | Rizzuto | B62B 5/02 280/641 |
| 3,388,920 A | * | 6/1968 | Hill, Sr. | B62B 3/027 280/641 |
| 3,595,178 A | * | 7/1971 | Dahlen | A21B 1/24 432/241 |
| 9,352,764 B1 | * | 5/2016 | Kossowsky | B62B 3/02 |
| 2002/0167139 A1 | * | 11/2002 | Prather | B62B 3/027 280/47.35 |
| 2002/0171214 A1 | * | 11/2002 | Prather | B62B 3/027 280/47.35 |
| 2005/0140118 A1 | * | 6/2005 | Prather | B62B 3/027 280/651 |
| 2015/0230479 A1 | * | 8/2015 | Foda | A21B 1/50 126/337 R |

* cited by examiner

*Primary Examiner* — Bryan A Evans

(57) ABSTRACT

A bakery cart includes a frame and a top cover. The frame includes corner supports, base rails, shelf ledges and hinged beams. The top cover swings from a cover position to a stow position, and frame moves from an expanded position to a collapsed position to reduce the frame width. Advantageously, the bakery cart is a reliable, lightweight, collapsible cart with a simple, inexpensive construction for holding shelves with food products in the expanded position and compact storage in the collapsed position.

17 Claims, 9 Drawing Sheets

COLLAPSIBLE UTILITY CART

FIELD OF THE INVENTION

The present invention relates to bakery carts, and more particularly to collapsible bakery carts for food products.

BACKGROUND OF THE INVENTION

Bakeries produce and sell flour-based, oven-baked food products such as bread, cookies, cakes, pastries and pies. Some bakeries are cafés with baked goods and assorted foods and beverages for customer dining on the premises. Others serve as specialty shops with decorative cakes for weddings, birthday parties, anniversaries and business events.

Bakeries use bakery carts to hold food products during baking operations such as oven baking and cooling outside the oven. Bakery carts also transport food products between bakery equipment such as the oven and refrigerator and between the bakery and external commercial businesses such as distribution centers and grocery stores.

Conventional bakery carts include a frame with corner supports, base rails, shelf ledges and wheels. The corner supports are vertically oriented, the base rails are laterally oriented and mechanically couple the corner supports to one another, the shelf ledges are mechanically coupled to the corner supports and laterally oriented to support shelves such as baking trays and sheet pans that hold baked goods and the wheels enable the bakery cart to be transported without lifting.

A major drawback of conventional bakery carts is that they are difficult and cumbersome to store. For instance, bakery carts with rigid non-collapsible frames occupy valuable floor space between baking operations which is particularly inconvenient for small shops. Bakery carts that dismantle require valuable time and labor for assembly and disassembly. Bakery carts that stack often have awkward nesting structures that are non-uniform and inefficient.

Accordingly, there is a need for a collapsible bakery cart that is reliable, lightweight, inexpensive and easily transportable.

SUMMARY OF THE INVENTION

The present invention is generally directed to a collapsible bakery cart for food products. The bakery cart opens into an expanded position for baking operations and closes into a collapsed position for compact storage between baking operations.

In accordance with an embodiment, a bakery cart includes a frame and a top cover. The top cover swings from a cover position to a stow position, and frame moves from an expanded position to a collapsed position to reduce the frame width.

In accordance with another embodiment, a bakery cart includes a frame and a top cover. The frame includes corner supports and base rails. The corner supports are vertically oriented and define front and back sides that extend a frame length and are separated by a frame width. The base rails are laterally oriented and mechanically coupled to the corner supports and extend along the frame length. The frame is movable such that the front and back sides move laterally towards and vertically away from one another as the frame moves from an expanded position to a collapsed position, thereby reducing the frame width and vertically offsetting the front and back sides without changing the frame length.

The top cover is pivotally coupled to the frame at the back side and swings from a cover position that covers the corner supports to a stow position that hangs from the frame at the back side.

The frame can include shelf ledges that are pivotally coupled to the corner supports at the front and back sides, extend along the frame width and rotate as the frame moves from the expanded position to the collapsed position.

The frame can also include hinged beams that are pivotally coupled to the corner supports at the front and back sides, extend along the frame width, are diagonally oriented as latched straight segments in the expanded position, unlatch and fold into V-shaped segments as the frame moves from the expanded position to the collapsed position and remain V-shaped segments in the collapsed position.

In accordance with a further embodiment, a bakery cart includes a frame that includes corner supports, base rails and shelf ledges. The corner supports include first, second, third and fourth corner supports that are vertically oriented and define a front side between the first and second corner supports, a back side between the third and fourth corner supports, a left side between the first and third corner supports and a right side between the second and fourth corner supports. The base rails include first, second, third and fourth base rails that are laterally oriented and orthogonal to the corner supports. The first base rail is rigidly coupled to the first and second corner supports at the front side, the second base rail is rigidly coupled to the first and second corner supports below the first base rail at the front side, the third base rail is rigidly coupled to the third and fourth corner supports at the back side and the fourth base rail is rigidly coupled to the third and fourth corner supports below the third base rail at the back side. The shelf ledges include first shelf ledges and second shelf ledges, the first shelf ledges are pivotally coupled to the first and third corner supports and are vertically offset from one another at the left side, the second shelf ledges are pivotally coupled to the second and fourth corner supports and are vertically offset from one another at the right side and corresponding pairs of the first and second shelf ledges are laterally aligned with one another.

The bakery cart also includes a top cover that is pivotally coupled to the third base rail. The top cover swings between a cover position that covers and is supported by the corner supports, and a stow position that is supported by the third and fourth corner supports, unsupported by the first and second corner supports and behind the third and fourth corner supports.

The frame is movable between an expanded position and a collapsed position. In the expanded position, the corner supports are laterally aligned with one another, the first and third base rails are laterally aligned with one another, the second and fourth base rails are laterally aligned with one another, the first and second corner supports are laterally spaced from the third and fourth corner supports by an expanded frame width and the shelf ledges are laterally oriented. In the collapsed position, the first and second corner supports are vertically offset from the third and fourth corner supports and are laterally spaced from the third and fourth corner supports by a collapsed frame width that is less than the expanded frame width, the first and third base rails are vertically offset from one another, the second and fourth base rails are vertically offset from one another and the shelf ledges are diagonally oriented.

The top cover is positionable in the cover and stow positions with the frame in the expanded position and is positionable in the stow position as the frame moves from the expanded position to the collapsed position.

The first and third corner supports can be laterally spaced from the second and fourth corner supports by the frame length in the expanded and collapsed positions. The first shelf ledges can rotate at and parallel to the left side and the second shelf ledges can rotate at and parallel to the right side as the frame moves between the expanded and collapsed positions. Further, corresponding pairs of the first and second shelf ledges can support a shelf in the expanded position.

Preferably, the top cover swings between 240 to 280 degrees, the shelf ledges rotate between 60 to 80 degrees, the frame height increases between 25 to 50 percent and the frame width decreases between 50 to 90 percent. More preferably, the top cover swings about 270 degrees, the shelf ledges rotate about 75 degrees, the frame height increases about 33 percent and the frame width decreases about 80 percent. It is also preferred that the bakery cart left and right sides are structural mirror images.

The bakery cart can include first, second, third and fourth caster wheels that are vertically aligned with the first, second, third and fourth corner supports respectively. The caster wheels can be laterally aligned with one another such that the bakery cart rolls on the caster wheels in the expanded position. In addition, the first and second caster wheels (at the front side) can be vertically offset from the third and fourth caster wheels (at the back side) such that the bakery cart rolls on only the unelevated caster wheels in the collapsed position. The caster wheels that elevate can enable the frame to move into the collapsed position in a first swivel position but prevent the frame from moving into the collapsed position in a second swivel position.

In accordance with a still further embodiment, a method of using a bakery cart includes (1) providing a frame and a top cover, wherein (a) the frame includes front and back sides that extend along a frame length and are separated by a frame width and left and right sides that extend along the frame width and are separated by the frame length to define a box-shaped interior space, and (b) the top cover is pivotally coupled to the frame at the back side, (2) swinging the top cover in a first angular direction, thereby moving the top cover from a lateral orientation that vertically covers the interior space to a vertical orientation behind the interior space, (3) collapsing the frame by moving the front and back sides laterally towards one another and vertically away from one another without moving the left and right sides laterally relative to one another, thereby reducing the frame width and vertically offsetting the front and back sides without changing the frame length, (4) expanding the frame by moving the front and back sides laterally away from one another and vertically towards one another without moving the left and right sides laterally relative to one another, thereby increasing the frame width and laterally aligning the front and back sides without changing the frame length, and (5) swinging the top cover in a second angular direction opposite the first angular direction, thereby moving the top cover from a vertical orientation behind the interior space to a lateral orientation that vertically covers the interior space.

The method can include (1) collapsing the frame by applying a first external force to hinged beams that are pivotally coupled to corner supports, thereby folding the hinged beams, rotating shelf ledges that are pivotally coupled to the corner supports in the second angular direction and forcing the frame to close, and (2) expanding the frame by applying a second external force opposite the first external force to the hinged beams, thereby unfolding the hinged beams, rotating the shelf ledges in the first angular direction and forcing the frame to open.

The method can also include (1) expanding the frame, (2) swinging the top cover in the second angular direction to cover the frame and mounting shelves with food products on the shelf ledges, (3) performing a baking operation, (4) removing the shelves from the shelf ledges and swinging the top cover in the first angular direction to uncover the frame, and (5) collapsing the frame.

Advantageously, the bakery cart is a reliable, lightweight, collapsible cart with a simple, inexpensive construction for holding shelves with food products in the expanded position and compact storage in the collapsed position.

These and other objects, features and advantages of the present invention will be further described and more readily apparent from detailed description and claims which follow.

BRIEF DESCRIPTION OF THE DRAWINGS

The present invention will be apparent from the following detailed description presented in connection with the accompanying drawings in which.

DETAILED DESCRIPTION OF THE INVENTION

Figure 1A:
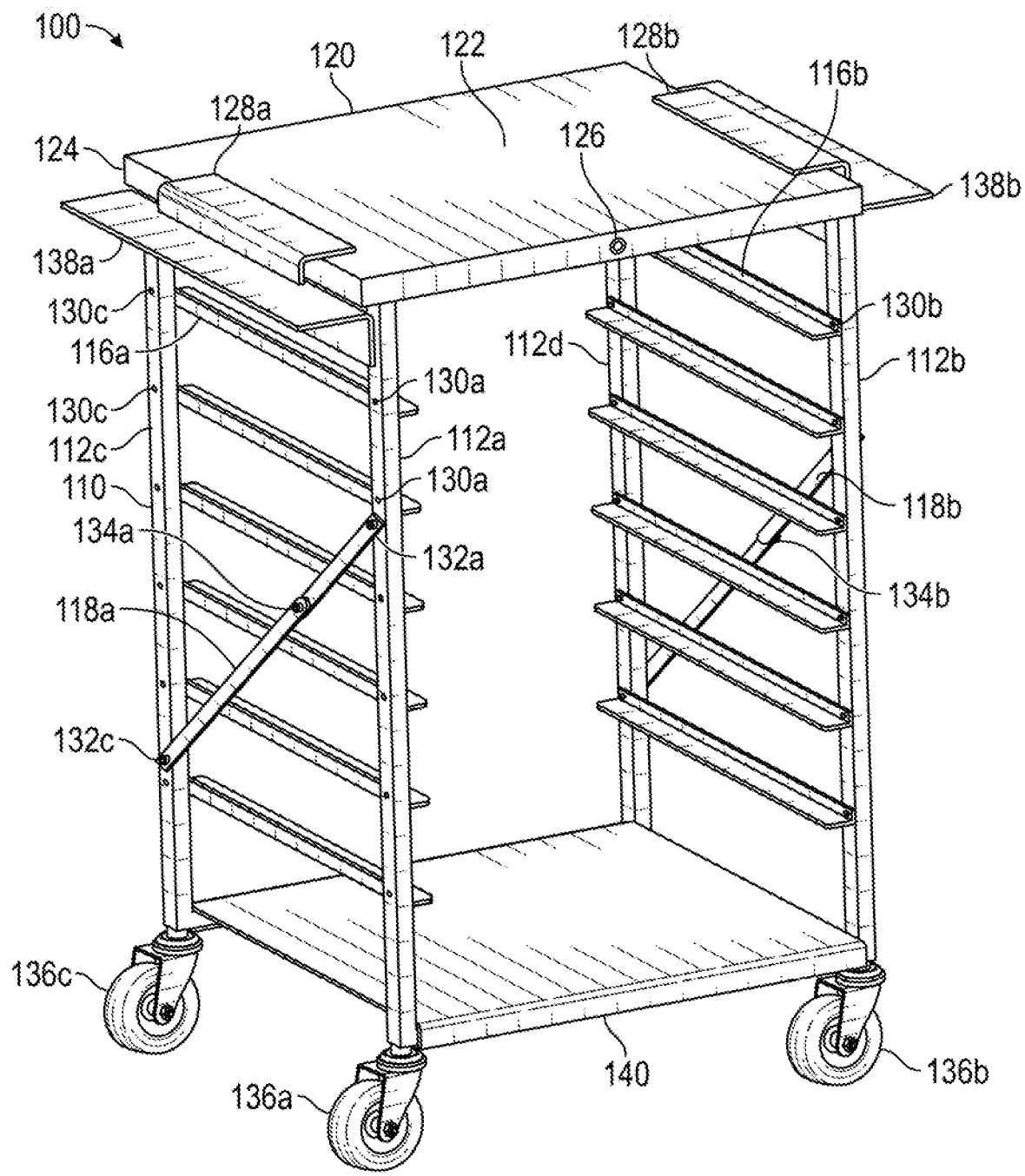
FIGS. 1A-1C show perspective, front and side views, respectively, of a bakery cart with a top cover in a cover position and a frame in an expanded position in accordance with an embodiment of the present invention.
Figure 1B:
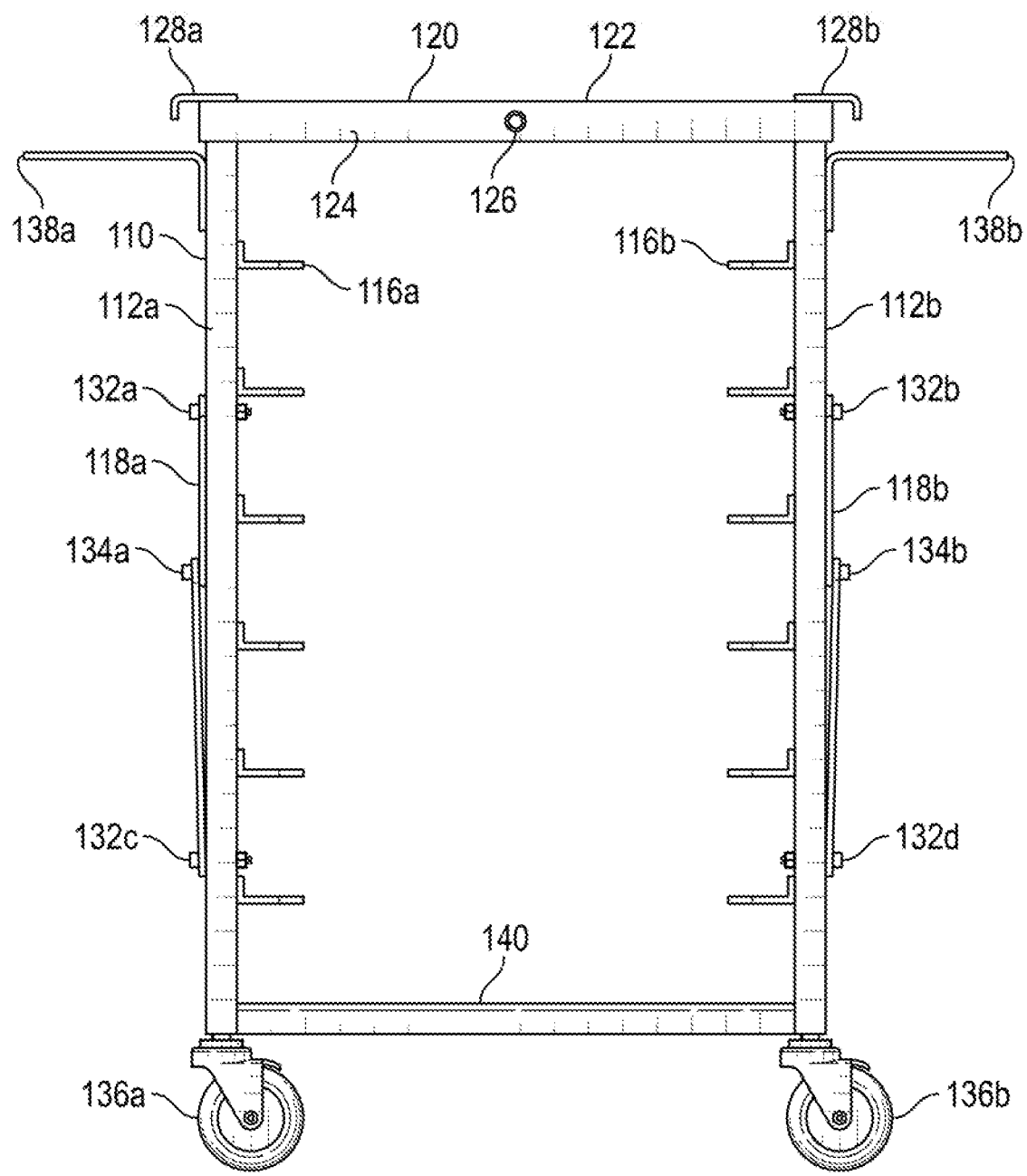
Figure 1C:
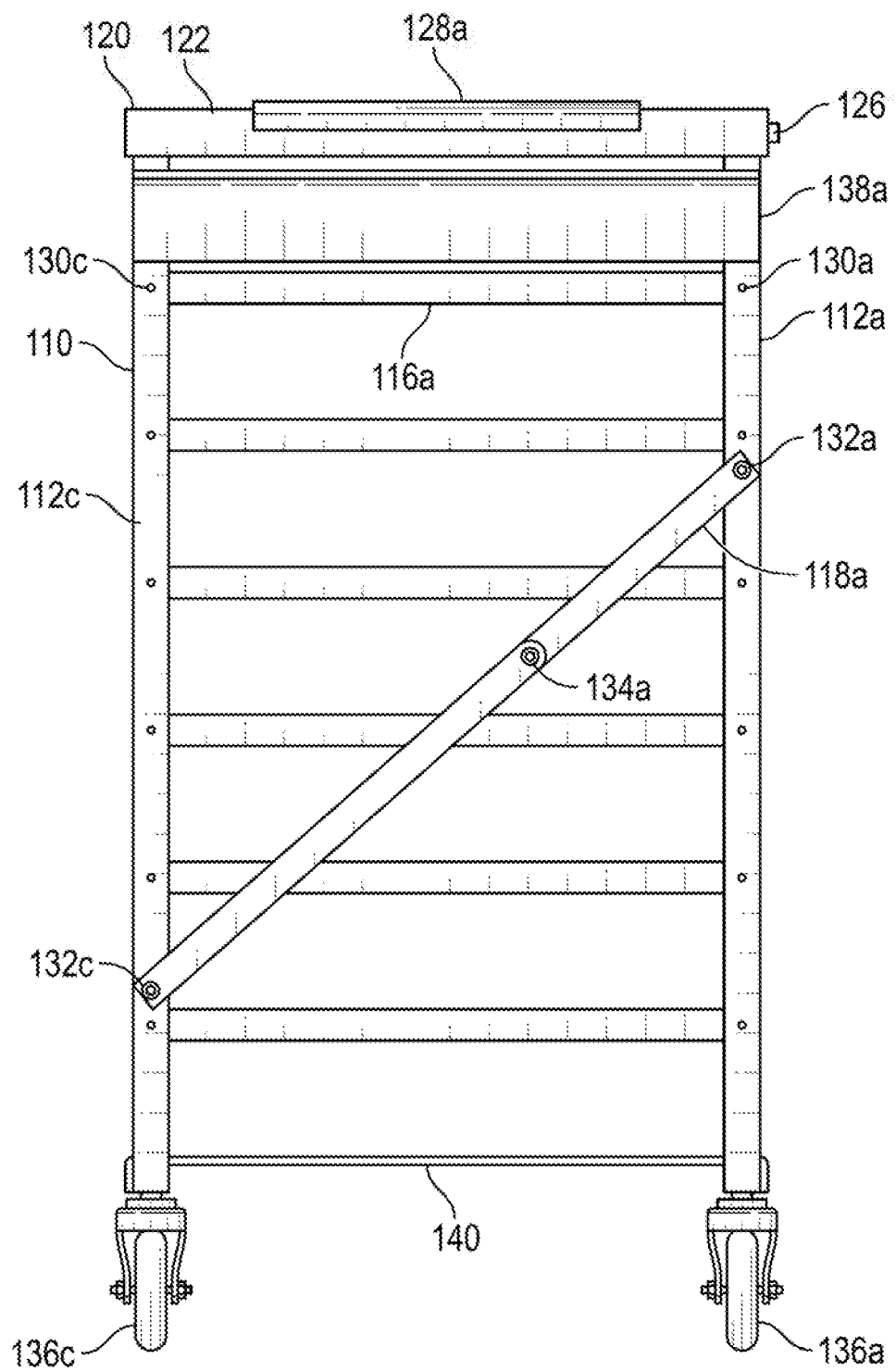

Following is a list of elements corresponding to a particular element referred to herein:
100 Bakery cart
110 Frame
112a-112d Corner supports
114a-114d Base rails
116a-116b Shelf ledges
118a-118b Hinged beams
120 Top cover
122 Top surface
124 Rim
126 Knob
128a-128b Handles
130a-130d Pivots
132a-132b Pivots
134a-134b Pivot Latches
136a-136d Caster wheels
138a-138b Top panels
140 Bottom shelf holder Referring to FIGS. 1A-IC, the present invention features bakery cart 100 that includes frame 110 in an expanded position and top cover 120 in a cover position.

Figure 3:
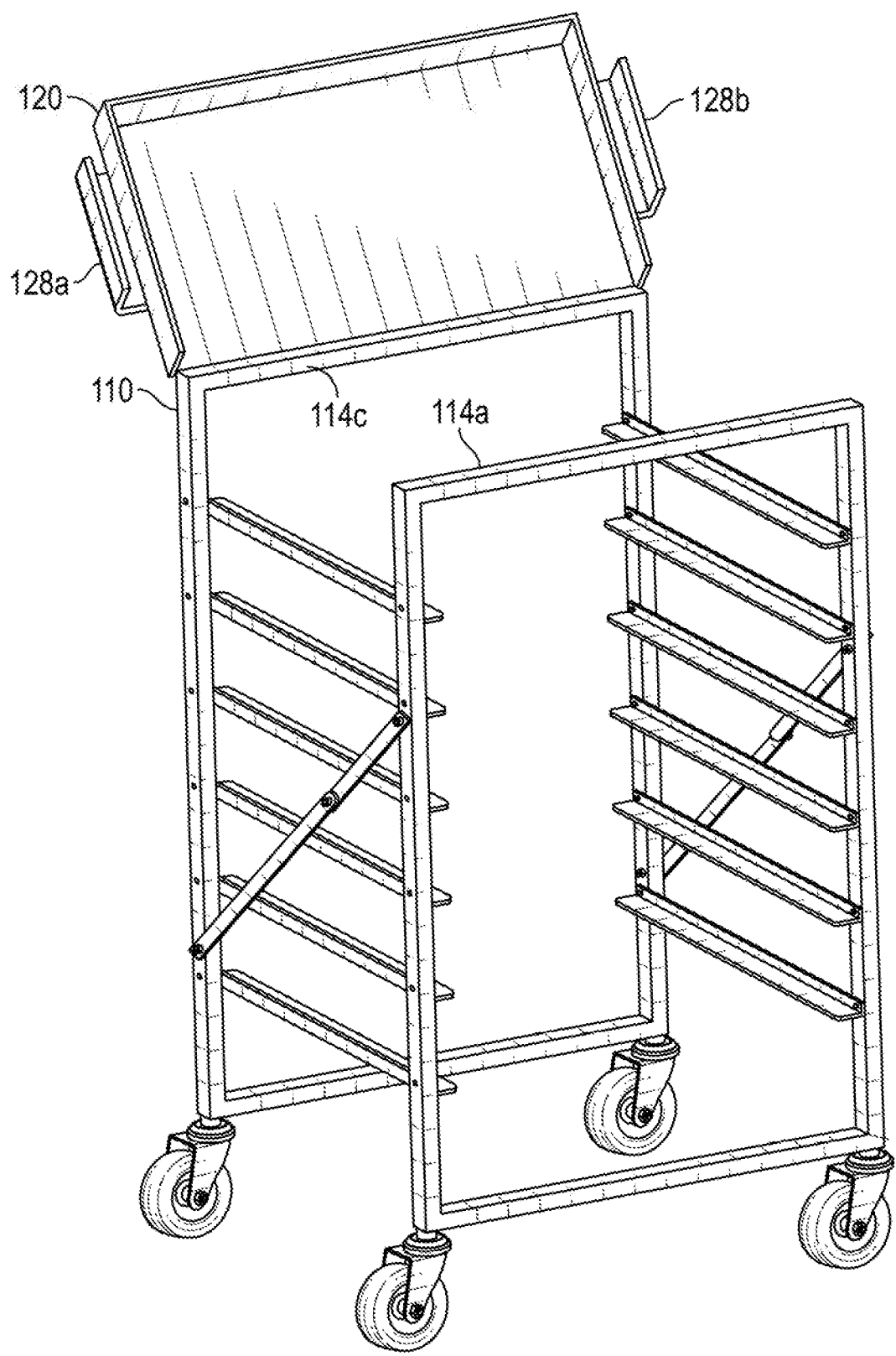
FIG. 3 shows a perspective view of the bakery cart as the top cover swings from the cover position to the stow position.

Frame 110 includes corner supports 112a-112d, base rails 114a-114d, shelf ledges 116a-116b and hinged beams 118a-118b (FIG. 3).

Corner supports 112a-112d are vertically oriented, laterally aligned (initially), permanently straight, square-shaped elongated metal posts. Base rails 114a-114d (FIG. 3) are laterally oriented, permanently straight, L-shaped elongated metal rails. Corner supports 112a and 112b are rigidly coupled at their top and bottom ends to base rails 114a and 114b, respectively, and corner supports 112c and 112d are rigidly coupled at their top and bottom ends to base rails 114c and 114d, respectively. Corner supports 112a and 112b and base rails 114a and 114b define a front side, corner supports 112c and 112d and base rails 114c and 114d define a back side, corner supports 112a and 112c define a left side and corner supports 112b and 112d define a right side of a box-shaped interior space. Thus, corner supports 112a-112d are orthogonal to base rails 114a-114d and collectively form spaced rectangular windows at the front and back sides. Corner supports 112a and 112b are laterally aligned and spaced by a frame length (L) in a longitudinal direction at the front side, corner supports 112c and 112d are laterally aligned and spaced by the frame length in the longitudinal direction at the back side, corner supports 112a and 112c are laterally aligned and spaced by a frame width (W) in a transverse direction at the left side and corner supports 112b and 112d are laterally aligned and spaced by the frame width in the transverse direction at the right side. Base rails 114a and 114b are vertically aligned and span the frame length at the front side and base rails 114c and 114d are vertically aligned and span the frame length at the back side.

Shelf ledges 116a and 116b are laterally oriented (initially), permanently straight, L-shaped elongated metal rails. Shelf ledges 116a are vertically offset and span the frame width at the left side and are pivotally coupled to corner supports 112a and 112c by pivots 130a and 130c at the front and back sides, respectively. Shelf ledges 116b are vertically offset and span the frame width at the right side and are pivotally coupled to corner supports 112b and 112d by pivots 130b and 130d at the front and back sides, respectively. Shelf ledges 116a and 116b (initially) form a ladder network with corner supports 112a/112c and 112b/112d at the left and right sides, respectively. In addition, corresponding pairs of shelf ledges 116a and 116b are laterally aligned to removably support a single shelf (not shown) mounted thereon. For instance, the top pair of shelf ledges 116a and 116b are laterally aligned with one another and support a single shelf, as do the remaining five pairs of shelf ledges 116a and 116b. For convenience of illustration, shelf ledges 116a and 116b and pivots 130a-130d at the top are designated with references numbers and the five below are not.

Hinged beams 118a and 118b are laterally aligned, diagonally oriented, straight (initially), rectangularly-shaped elongated metal beams. Hinged beam 118a spans the frame width at the left side and is pivotally coupled to corner supports 112a and 112c by pivots 132a and 132c to the left of shelf ledges 116a at the front and back sides, respectively, and hinged beam 118b spans the frame width at the right side and is pivotally coupled to corner supports 112b and 112d by pivots 132b and 132d to the right of shelf ledges 116b at the front and back sides, respectively.

Hinged beams 118a and 118b include latch pivots 134a and 134b, respectively, between pivots 132a/132c and 132b/132d, respectively, that enable hinged beams 118a and 118b to latch into straight elongated beams that secure frame 110 in the expanded position, unlatch and fold into V-shaped segments in response to external pressure to collapse frame 110 into the collapsed position, and subsequently unfold and latch back into straight elongated beams to expand frame 110 into expanded position in response to external pressure as described below. Preferably, latch pivots 134a and 134b include a tab and notch (FIG. 7) that snap fit into a secure but reversible mechanical connection to hold hinged beams 118a and 118b in place to secure frame 110 in the expanded position.

Top cover 120 is a laterally oriented (initially) elongated metal sheet that includes top surface 122, rim 124, knob 126 and handles 128a and 128b. Top cover 120 is pivotally coupled to base rail 114c by a hinged rod (not shown) at the back side. In the expanded position, top cover 120 rests on corner supports 112a-112d and base rails 114a and 114c and covers frame 110 along with the interior space as top surface 122 faces upward away from frame 110.

Bakery cart 100 also includes caster wheels 136a, 136b, 136c and 136d which are vertically aligned with and mechanically coupled to corner posts 112a, 112b, 112c and 112d, respectively. Caster wheels 136a and 136b are mechanically coupled to corner posts 112a and 112b, respectively, by base rail 114b, and caster wheels 136c and 136d are mechanically coupled to corner posts 112c and 112d, respectively, by base rail 114d. Caster wheels 136a, 136b, 136c and 136d are (initially) laterally aligned with one another below frame 110. In addition, caster wheels 136c and 136d include latchable brakes (not shown) that can be locked and unlocked by the user. Bakery cart 100 rolls on caster wheels 136a. 136b, 136c and 136d in the expanded position unless the brakes are applied.

Bakery cart 100 also includes (initially) top panels 138a and 138b detachably mounted on corner supports 112a/112c and 112b/112d near handles 128a and 128b at the left and right sides, respectively, and bottom shelf holder 140 detachably mounted on base rails 114b and 114d below shelf ledges 120a and 120b. Thus, bakery cart 100 can carry up to seven shelves (not shown) on six pairs of corresponding ledges 116a and 116b and bottom shelf holder 140 as well as other items on top cover 120, top panels 138a and 138b and bottom shelf holder 140.

At this stage, bakery cart 100 functions like a conventional bakery cart and is well suited for baking operations.

Figure 2:
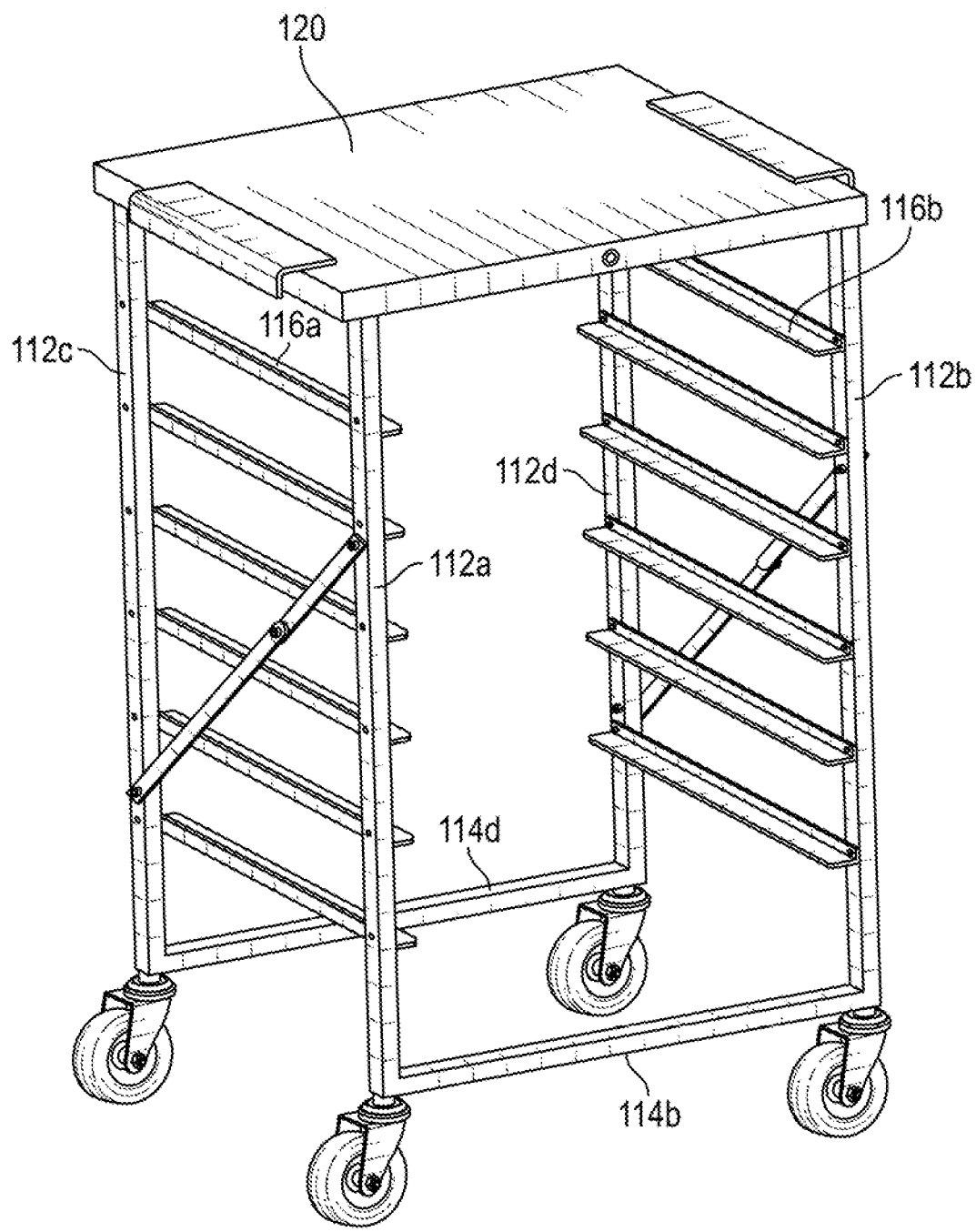
FIG. 2 shows a perspective view of the bakery cart with detachable components removed.

FIG. 2 shows a perspective view of bakery cart 100 with top panels 138a and 138b and bottom shelf holder 140 removed. For instance, top panels 138a and 138b are unscrewed from corner supports 112a/112c and 112b/112d, respectively, and bottom shelf holder 140 is lifted off base rails 114b and 114d. A user can manually remove these items one at a time and temporarily place them on top cover 120 if desired. Top panels 138a and 138b and bottom shelf holder 140 are the only detachable components since the shelves previously mounted on shelf ledges 116a and 116b and/or bottom shelf holder 140 have already been removed.

FIG. 3 shows a perspective view of bakery cart 100 as top cover 120 swings from the cover position to the stow position. The user can grasp knob 126 and/or handles 128a and 128b to pull top cover 120 off base rails 114a and 114c and swing top cover 120 backwards (counterclockwise) while he/she stands to the left or right side to avoid collision as top cover 120 rotates backwards. At this stage, top cover 120 has rotated backwards about 120 degrees from the cover position and no longer covers or overlays frame 110 or the interior space.

Figure 4:
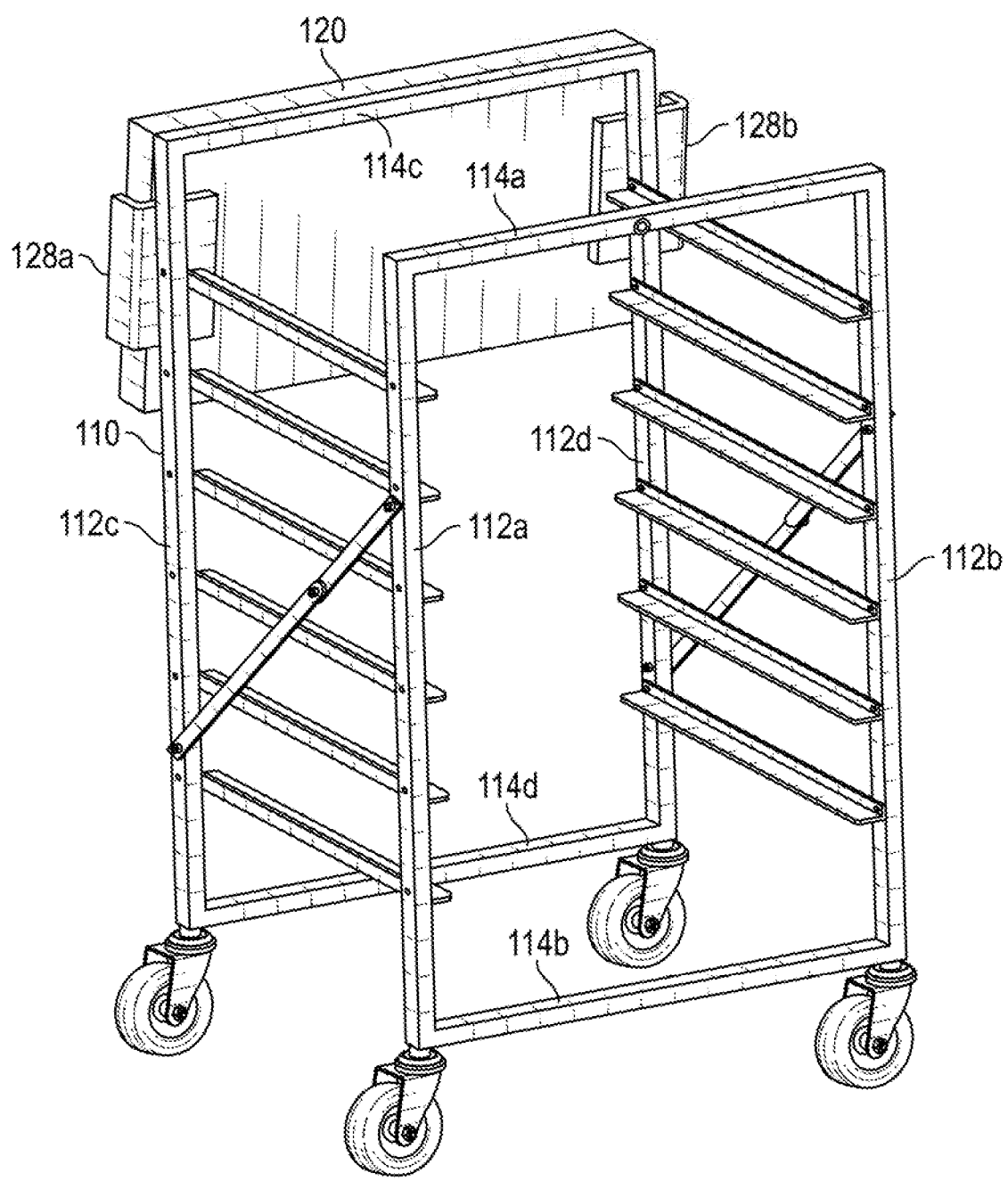
FIG. 4 shows a perspective view of the bakery cart with the top cover in the stow position.

FIG. 4 shows a perspective view of bakery cart 100 with top cover 120 in the stow position. The user can continue to grasp knob 126 and/or handles 128a and 128b but apply little or no pulling force and perhaps mild braking force as top cover 120 continues to rotate backwards assisted by gravity and angular momentum. Top cover 120 eventually collides with corner supports 112c and 112d and comes to rest with a vertical orientation as it hangs from corner supports 112c and 112d and base rail 114c behind frame 110 in the stow position. Top surface 122 faces forward towards corner supports 112a-112d and frame 110 is completely exposed from the top side. Top cover 120 has rotated backwards about 270 degrees from the cover position to the stow position where it is supported by corner supports 112c and 112d and base rail 114c at the back side but is no longer supported by corner supports 112a and 112b or base rails 114a and 114b at the front side.

Figure 5:
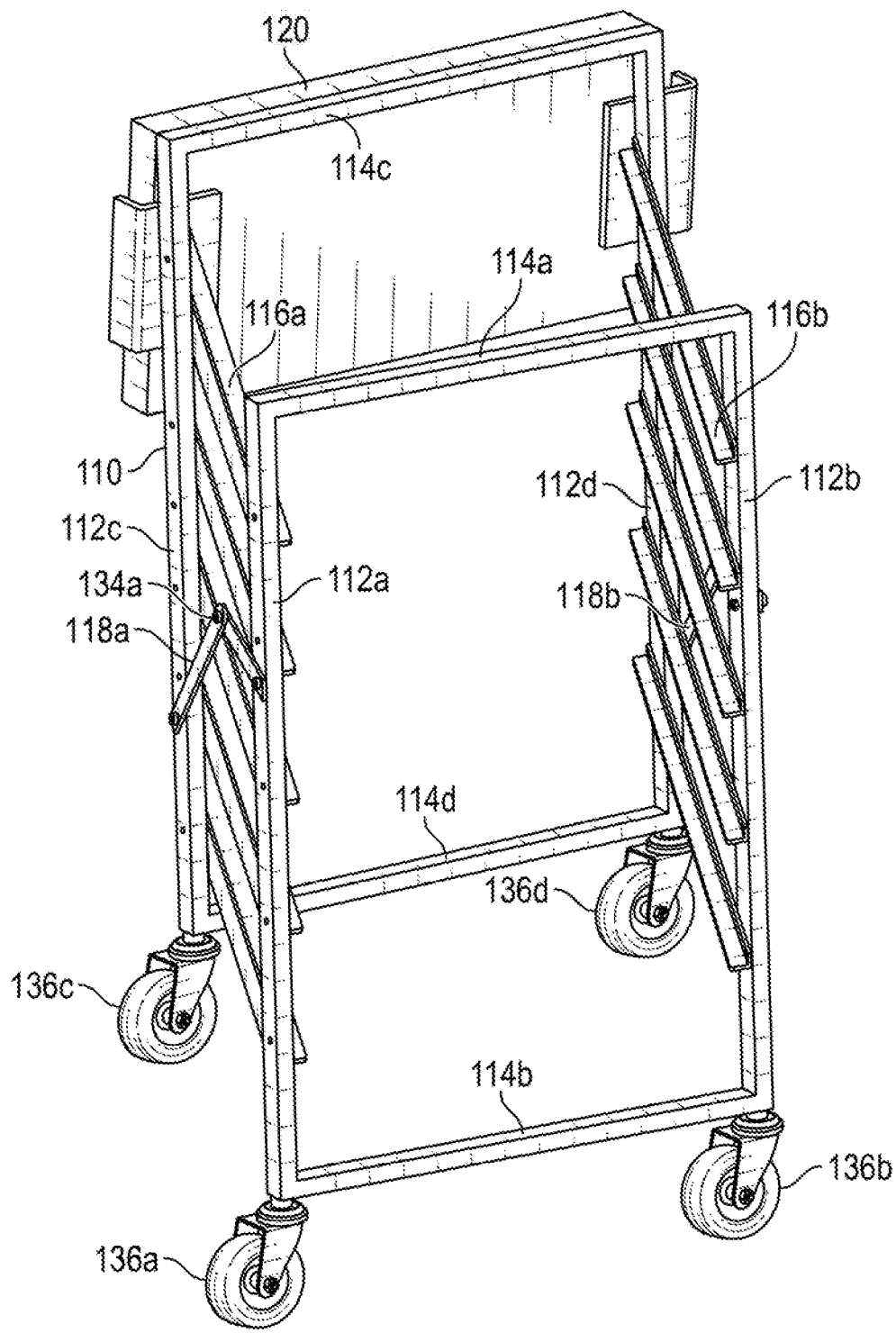
FIG. 5 shows a perspective view of the bakery cart as the frame moves from the expanded position to the collapsed position.

FIG. 5 shows a perspective view of bakery cart 100 as frame 110 moves from the expanded position to the collapsed position. The user can grasp hinged beams 118a and 118b at pivot latches 134a and 134b, respectively, and pull them towards base rail 114c as the user stands behind bakery cart 100 and leans it slightly forward on caster wheels 136a and 136b. As a result, hinged beams 118a and 118b unlatch as they rotate at pivots 132a/132c and 132b/132d, respectively, and fold into V-shaped segments that pull corner supports 112c and 112d laterally towards and vertically away from corner supports 112a and 112b, base rails 114c and 114d move laterally towards and vertically away from base rails 114a and 114b, and caster wheels 136c and 136d move laterally towards and vertically away from caster wheels 136a and 136b as they elevate off the ground. Hinged beams 118a and 118b also force shelf ledges 116a and 116b to rotate forwards (clockwise) at pivots 130a/130c and 130b/130d, respectively, and shift from lateral to diagonal orientation. Moreover, the frame length remains constant as the frame height increases and the frame width decreases. At this stage, frame 110 is partially collapsed.

Figure 6:
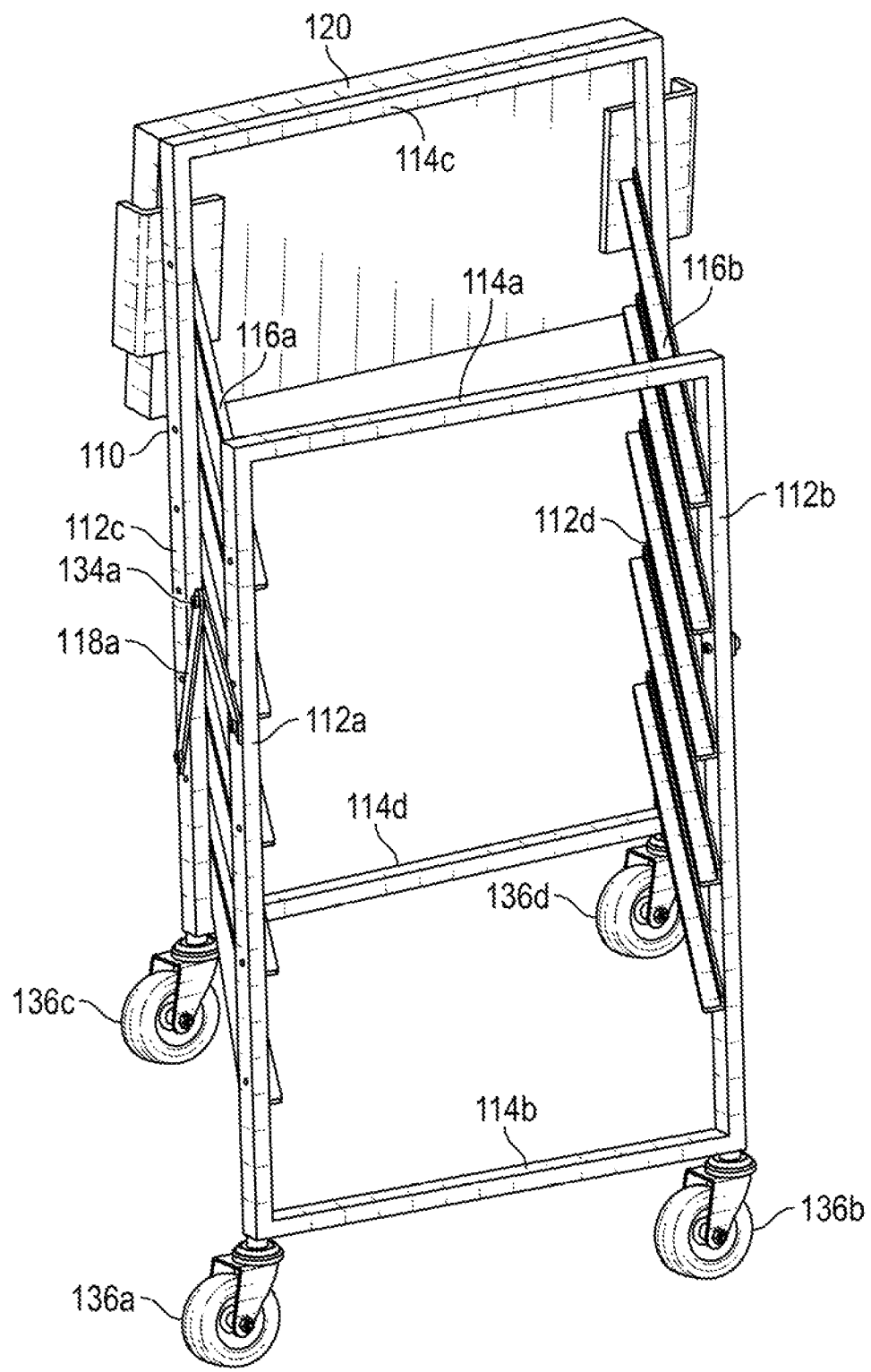
FIG. 6 shows a perspective view of the bakery cart with the frame in the collapsed position.

FIG. 6 shows a perspective view of bakery cart 100 with frame 110 in the collapsed position. The user can continue to tug on hinged beams 118a and 118b, or alternatively, stand to the side to grasp base rails 114a and 114c and push them together. Either way, the user continues to force the back side forward towards and vertically above the front side as shelf ledges 116a and 116b continue to rotate forwards and hinged beams 118a and 118b continue to fold into increasingly acute V-shaped segments. The user may need to swivel caster wheels 136c and 136d from a first swivel position that blocks the frame movement to a second swivel position that enables frame 110 to fully collapse due to their asymmetrical construction. Eventually, shelf ledges 116a and 116b reach a contact stop at their maximum vertical and rotational extent and the frame movement stops.

At this stage, frame 110 is in the collapsed position. Corner supports 112c and 112d, base rails 114c and 114d and caster wheels 136c and 136d are vertically elevated relative to corner supports 112a and 112b, base rails 114a and 114b and caster wheels 136a and 136b, respectively, such that the frame height increases about 33 percent as frame 110 moves from the expanded to the collapsed position. Likewise, and more importantly, corner supports 112c and 112d, base rails 114c and 114d and caster wheels 136c and 136d are closer to corner supports 112a and 112b, base rails 114a and 114b and caster wheels 136a and 136b, respectively, in the transverse direction since the frame width decreases about 80 percent as frame 110 moves from the expanded to the collapsed position. Shelf ledges 116a and 116b rotate about 75 degrees and top cover 120 continues to hang from corner supports 112c and 112d and base rail 114c in the stow position while the frame length remains constant as frame 110 moves from the expanded to the collapsed position. In addition, corner supports 112c and 112d, base rails 114c and 114d and top cover 120 are mechanically coupled to corner supports 112a and 112b and base rails 114a and 114b solely by shelf ledges 116a and 116b and hinged beams 118a and 118b. The user can now stand in front of bakery cart 100 and roll it on caster wheels 136a and 136b from the kitchen to a storage location.

Bakery cart 100 can be rolled from the storage location back to the kitchen for another round of baking operations. Frame 110 moves from the collapsed position to the expanded position and then top cover 120 swings from the stow position to the cover position in essentially the same manner as described above but in reverse order and opposite directions. Therefore, the specific details of moving top cover 120 from the stow position to the cover position and then moving frame 110 from the collapsed position to the expanded position as well as re-attaching top panels 138a and 138b and bottom shelf holder 140 and mounting shelves with food products on ledges shelf 116a and 116b and bottom shelf holder 140 will be clear to those skilled in the art.

Figure 7:
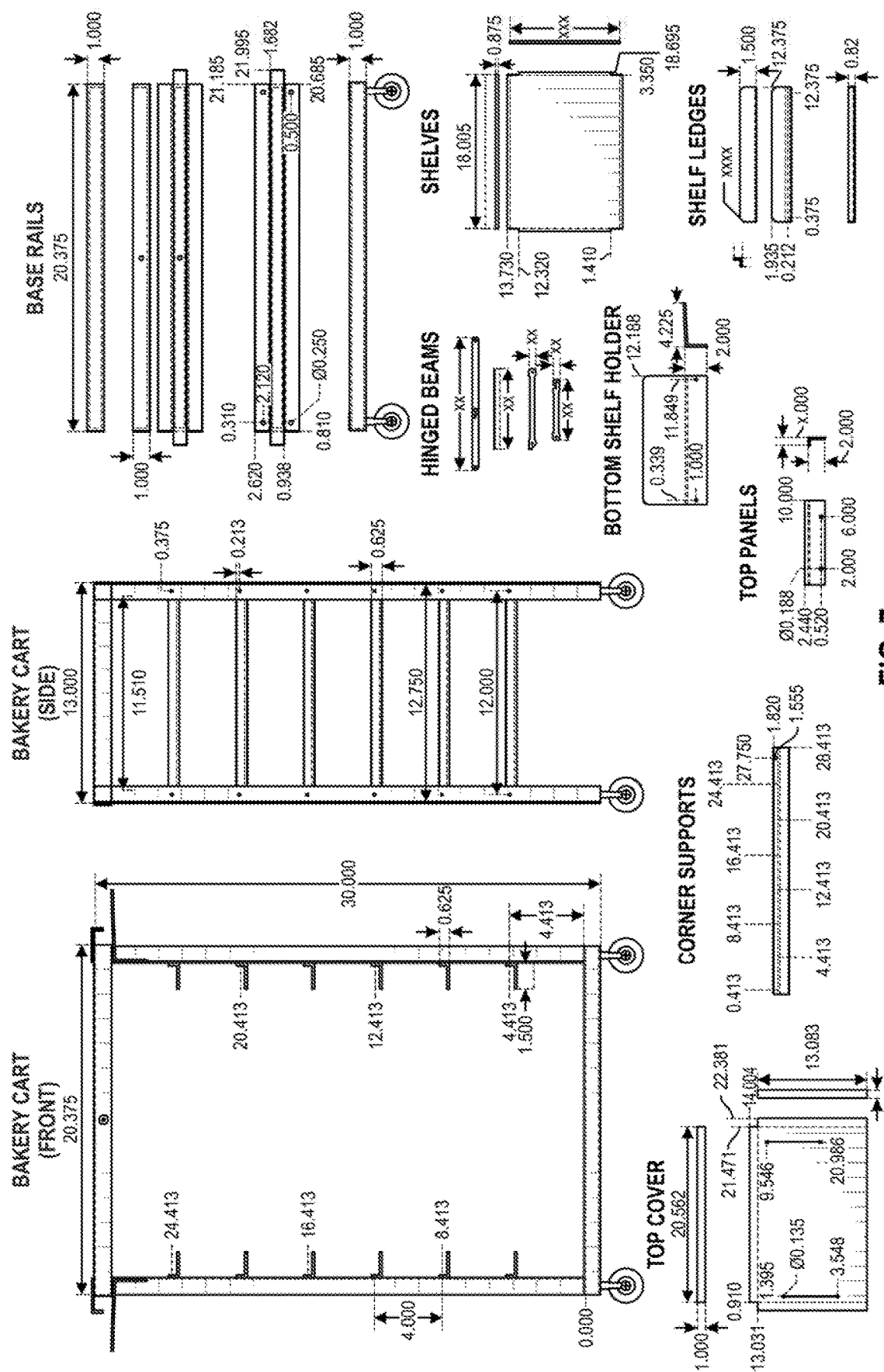
FIG. 7 shows a schematic diagram of the bakery cart.

FIG. 7 shows a schematic diagram of bakery cart 100. This non-limiting example of the present invention discloses construction details. However, this example is for illustration purposes only and is not intended to limit the present invention in any way. Equivalents or substitutes are within the scope of the present invention.

Bakery cart 100 as described above collapses by elevating the back side relative to the front side. However, alternatively or in addition to this approach, bakery cart 100 can be configured and operated to collapse by elevating the front side relative to the back side. In other words, corner supports 112a and 112b, base rails 114a and 114b and caster wheels 136a and 136b vertically elevate relative to corner supports 112c and 112d, base rails 114c and 114d and caster wheels 136c and 136d, respectively, as shelf ledges 116a and 116b rotate counterclockwise, hinged beams 118a and 118b fold in response to external pressure and caster wheels 136c and 136d remain on the ground, as will be clear to those skilled in the art. Thus, the front and back sides are laterally aligned in the expanded position and vertically offset in the collapsed position regardless of whether the front side is elevated relative to the back side or vice-versa.

Bakery cart 100 occupies far less floor space in the collapsed position than in the expanded position to provide convenient storage between baking operations. Moreover, bakery cart 100 is a reliable, light weight, low-cost transportable cart with a unitary integrated aluminum structure that is easy to expand and collapse as well as transport in both the expanded and collapsed positions.

Bakery cart 100 consists essentially of corner supports 112a-112d, base rails 114a-114d, shelf ledges 116a and 116b, hinged beams 118a and 118b, top cover 120, pivots 130a-130d and 132a-132d and caster wheels 136a-136d. Bakery cart 100 may include other items such as screws, nuts, washers, brackets and the like that have no appreciable effect on weight, volume or operation. Likewise, detachable components such as shelves, shelf holders, panels and the like are not essential.

Bakery cart 100 is well suited for a wide variety of baking, transportation and storage operations in retail, commercial and industrial establishments such as bakeries, pizzerias, restaurants, grocery stores and factories.

As used herein, "lateral alignment" refers to horizontal alignment at the same height in a horizontal plane that extends in the longitudinal and transverse directions, and "vertical alignment" refers to the same lateral position at different heights.

As used herein, the geometric terms such as "vertical," "lateral," "longitudinal," "transverse," "parallel," "orthogonal," "front", "back", "left", "right," "height," "length," "width" and the like refer to the upright position relative to gravity and can vary by plus or minus 10 percent of the referenced orientation.

Various modifications of the present invention, in addition to those described herein, will be apparent to those skilled in the art from the foregoing description. Such modifications shall fall within the scope of the appended claims.

What is claimed is:

1. A bakery cart, comprising;
a frame that includes corner supports and base rails, wherein the corner supports are vertically oriented and define front and back sides that extend a frame length and are separated by a frame width, the base rails are laterally oriented and mechanically coupled to the corner supports and extend along the frame length and the frame is movable such that the front and back sides move laterally towards and vertically away from one another as the frame moves from an expanded position to a collapsed position, thereby reducing the frame width and vertically offsetting the front and back sides without changing the frame length; and
a top cover that is pivotally coupled to the frame at the back side and swings from a cover position that covers the corner supports to a stow position that hangs from the frame at the back side.

2. The bakery cart of claim 1, wherein the frame includes shelf ledges that are pivotally coupled to the corner supports at the front and back sides, extend along the frame width and rotate as the frame moves from the expanded position to the collapsed position.

3. The bakery cart of claim 2, wherein the frame includes hinged beams that are pivotally coupled to the corner supports at the front and back sides, extend along the frame width, are diagonally oriented as latched straight segments in the expanded position, unlatch and fold into V-shaped segments as the frame moves from the expanded position to the collapsed position and remain V-shaped segments in the collapsed position.

4. The bakery cart of claim 3, wherein the bakery cart consists essentially of the corner supports, the base rails, the shelf ledges, the hinged beams, the top cover, pivots and caster wheels.

5. The bakery cart of claim 1, including:
means for swinging the top cover; and
means for expanding and collapsing the frame.

6. A bakery cart, comprising
a frame that includes corner supports, base rails and shelf ledges, wherein:
the corner supports include first, second, third and fourth corner supports that are vertically oriented and define a front side between the first and second corner supports, a back side between the third and fourth corner supports, a left side between the first and third corner supports and a right side between the second and fourth corner supports;
the base rails include first, second, third and fourth base rails that are laterally oriented and orthogonal to the corner supports, wherein the first base rail is rigidly coupled to the first and second corner supports at the front side, the second base rail is rigidly coupled to the first and second corner supports below the first base rail at the front side, the third base rail is rigidly coupled to the third and fourth corner supports at the back side and the fourth base rail is rigidly coupled to the third and fourth corner supports below the third base rail at the back side; and
the shelf ledges include first shelf ledges and second shelf ledges, the first shelf ledges are pivotally coupled to the first and third corner supports and are vertically offset from one another at the left side, the second shelf ledges are pivotally coupled to the second and fourth corner supports and are vertically offset from one another at the right side and corresponding pairs of the first and second shelf ledges are laterally aligned with one another; and
a top cover that is pivotally coupled to the third base rail and swings between (1) a cover position that covers and is supported by the corner supports, and (2) a stow position that is supported by the third and fourth corner supports, unsupported by the first and second corner supports and behind the third and fourth corner supports; wherein
the frame is movable between (1) an expanded position in which the corner supports are laterally aligned with one another, the first and third base rails are laterally aligned with one another, the second and fourth base rails are laterally aligned with one another, the first and second corner supports are laterally spaced from the third and fourth corner supports along an expanded frame width and the shelf ledges are laterally oriented, and (2) a collapsed position in which the first and second corner supports are vertically offset from the third and fourth corner supports and are laterally spaced from the third and fourth corner supports by a collapsed frame width that is less than the expanded frame width, the first and third base rails are vertically offset from one another, the second and fourth base rails are vertically offset from one another and the shelf ledges are diagonally oriented; and
the top cover is positionable in the cover and stow positions with the frame in the expanded position and is positionable in the stow position as the frame moves from the expanded position to the collapsed position.

7. The bakery cart of claim 6, wherein the first and third corner supports are laterally spaced from the second and fourth corner supports by the frame length in the expanded and collapsed positions.

8. The bakery cart of claim 6, wherein the top cover includes a top surface that faces away from the corner supports in the cover position and faces towards the corner supports in the stow position.

9. The bakery cart of claim 6, wherein the top cover swings between 240 to 280 degrees between the cover and stow positions and the expanded frame width decreases between 50 to 90 percent to the collapsed frame width as the frame moves from the expanded position to the collapsed position.

10. The bakery cart of claim 6, wherein the first shelf ledges form a first ladder network with the first and third corner supports in the expanded position and the second shelf ledges form a second ladder network with the second and fourth corner supports in the expanded position.

11. The bakery cart of claim 6, wherein the shelf ledges are straight elongated rails that rotate parallel to the left and right sides and remain straight as the frame moves between the expanded and collapsed positions.

12. The bakery cart of claim 11, wherein the first shelf ledges rotate between 60 to 80 degrees at the left side and the second shelf ledges rotate between 60 to 80 degrees at the right side as the frame moves between the expanded and collapsed positions.

13. The bakery cart of claim 6, wherein the corresponding pairs of the first and second shelf ledges support a shelf in the expanded position.

14. The bakery cart of claim 6, wherein the bakery cart is devoid of detachable components in the collapsed position.

15. The bakery cart of claim 6, including a first hinged beam that is diagonally oriented and pivotally coupled to the first and third corner supports to a left of the first shelf ledges and a second hinged beam that is diagonally oriented and pivotally coupled to the second and fourth corner supports to a right of the second shelf ledges, wherein the hinged beams latch into straight elongated beams to secure the frame in the expanded position, fold into unlatched V-shaped segments in response to external pressure to move the frame from the expanded position to the collapsed position, and unfold back into latched straight elongated beams in response to external pressure to move the frame from the collapsed position to the expanded position.

16. The bakery cart of claim 6, including first, second, third and fourth caster wheels that are vertically aligned with the first, second, third and fourth corner supports respectively, wherein the caster wheels are laterally aligned with one another such that the bakery cart rolls on the caster wheels in the expanded position, and the first and second caster wheels are vertically offset from the third and fourth wheels such that (i) the first and second caster wheels are elevated and the third and fourth caster wheels are unelevated if the front side is elevated relative to the back side in the collapsed position, (ii) the third and fourth caster wheels are elevated and the first and second caster wheels are unelevated if the back side is elevated relative to the front side in the collapsed position, (iii) the bakery cart rolls on the elevated and unelevated caster wheels in the expanded position and (iv) the bakery cart rolls on only the unelevated caster wheels in the collapsed position.

17. The bakery cart of claim 16, wherein the elevated caster wheels enable the frame to move into the collapsed position when the elevated caster wheels are in a first swivel position, and the elevated caster wheels prevent the frame from moving into the collapsed position when the elevated caster wheels are in a second swivel position.

* * * * *